(12) United States Patent
Jayaweera

(10) Patent No.: US 10,979,481 B2
(45) Date of Patent: Apr. 13, 2021

(54) SYSTEM AND METHOD FOR DYNAMICALLY EXPANDING CONFERENCING CAPABILITIES AND FACILITATING ON DEMAND TRANSACTIONS WITHIN SOCIAL NETWORK ENVIRONMENTS

(71) Applicant: Surya Jayaweera, Claremont, CA (US)

(72) Inventor: Surya Jayaweera, Claremont, CA (US)

(*) Notice: Subject to any disclaimer, the term of this patent is extended or adjusted under 35 U.S.C. 154(b) by 0 days.

(21) Appl. No.: 16/532,305

(22) Filed: Aug. 5, 2019

(65) Prior Publication Data

US 2021/0044645 A1 Feb. 11, 2021

(51) Int. Cl.
  *H04L 29/06* (2006.01)
  *H04W 4/24* (2018.01)
  *H04L 12/18* (2006.01)
  *H04L 12/24* (2006.01)
  *A63F 13/87* (2014.01)

(52) U.S. Cl.
  CPC ............. *H04L 65/80* (2013.01); *H04L 12/18* (2013.01); *H04L 12/1822* (2013.01); *H04L 29/06414* (2013.01); *H04L 41/026* (2013.01); *H04L 65/1069* (2013.01); *H04L 65/403* (2013.01); *H04L 65/601* (2013.01); *H04W 4/24* (2013.01); *A63F 13/87* (2014.09)

(58) Field of Classification Search
  CPC ... H04L 65/80; H04L 65/1069; H04L 65/403; H04L 65/601; H04L 12/18; H04L 29/06414; H04L 12/1822; H04L 41/026; H04W 4/24; A63F 13/87
  See application file for complete search history.

(56) References Cited

U.S. PATENT DOCUMENTS

| | | | | |
|---|---|---|---|---|
| 2011/0161834 A1* | 6/2011 | Shadfar | .................. | H04L 67/38 715/753 |
| 2011/0270933 A1* | 11/2011 | Jones | .................. | H04L 12/1822 709/206 |
| 2013/0232213 A1* | 9/2013 | Bustamente | .......... | H04L 67/306 709/206 |
| 2016/0314617 A1* | 10/2016 | Forster | .................... | G06T 17/00 |
| 2017/0124664 A1* | 5/2017 | Savenok | ................. | H04L 63/10 |
| 2018/0109570 A1* | 4/2018 | Kowal | ............... | H04L 65/1089 |
| 2019/0297119 A1* | 9/2019 | Vashisht | ............. | H04L 65/4023 |
| 2020/0016495 A1* | 1/2020 | Cruz | .................... | H04L 65/1069 |

* cited by examiner

*Primary Examiner* — Michael A Keller
(74) *Attorney, Agent, or Firm* — Loza & Loza, LLP; Julio Loza

(57) ABSTRACT

A web-based, online session system is provided in which a host server manages a multi-participant session. A plurality of participating devices may join the online session using a web-based interface and receive session content (e.g., video, audio, text, graphics, etc.) via the web-based interface. A user of a participating device may dynamically expand its resources/capabilities during an ongoing online session by adding accessory/supporting devices under its own participant account to the session. The added devices may communicate directly with the host server via a separate stream than the participating device. Additionally, the participating device may also transfer its complete participation in the online session to another device via the web-based interface.

19 Claims, 17 Drawing Sheets

*Exemplary Method to Transfer Call/Session Control from First Device to Second Device*

*Exemplary Method to Multi-User Document Sharing and Tracking Within Session*

SYSTEM AND METHOD FOR DYNAMICALLY EXPANDING CONFERENCING CAPABILITIES AND FACILITATING ON DEMAND TRANSACTIONS WITHIN SOCIAL NETWORK ENVIRONMENTS

FIELD

Various aspects disclosed herein relate to social network environments and more particularly to dynamically expanding conferring capabilities and facilitating on demand transactions (e.g., offer and acceptance) within such social network environment.

BACKGROUND

Social network environments serve to connect users and provide a communications, sharing, and/or learning platform among those users. Online conferencing and user-to-user transactions are two features often provided by social network environments.

Online conferencing software allows users to communicate using video, audio, and/or data. For instance, most online conferencing software facilitates exchanging video and/or audio transmissions between two or more user devices. However, one shortcoming of prior art online conferencing software is the inability to permit a participant to dynamically expand single-point display capabilities. For instance, prior art online conferencing software/systems do not permit a participant, using a first device for a conference session, to dynamically transfer the video conference session to a second device. Likewise, prior art video conferencing software/systems do not permit a participant, using the first device for a video conference session, to dynamically add a second device to the same video conference session.

Additionally, during multi-participant video/audio conferences, it would be advantageous to be able to facilitate various other features that facilitates interactions and transactions among participants. Transactions, both commercial and non-commercial, are also often transacted in social network environments. For instance, two users may use the social network environments to initiate the exchange goods and/or services for money or payment. However, setting up and fulfilling such transaction is often complicated when one of the parties is not already part of the social network environment.

Consequently, devices and methods are needed that permit online conference participants to dynamically extend their resources used in a conference/session as well as provide tools or features that facilitate various transactions during such conference/session.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A first aspect provides a method operational by a session host device to host a multi-participant conference session. The host device may host an online session having a plurality of participant devices over a network, each participant device identified by a participant account and/or a unique device identifier. The host device may receive a (first) request from a first device to be added to the online session, the first device having a first participant account and a first unique device identifier. Similarly, the host device may receive another (second) request from a second device to be added to the online session, the second device having the first participant account and a second unique device identifier. In one example, participants may request to be added to the online session via a website interface. For instance, the online session may include a web-based participant interface and session content is shared with participants via the web-based participant interface.

The host device may then transmit and/or receive individual streams of session content to/from each participant device, including the first device and the second device. The individual streams of session content may include a first stream to the first device, a second stream from the first device, and at least one of a third stream to the second device or a fourth stream from the second device, and the session content may include data, audio, and/or video which are transmitted as distinct sub-streams within a stream of session content. One aspect provides for session host device to dynamically adjust bandwidth allocation of at least one of the first, second, third, or fourth streams. The second stream may include session content captured at the first device, the fourth stream includes session content captured at the second device.

Additionally, the session host device may selectively send a first subset of session content to a first subset of participant devices and a second subset of session content to a second subset of participant devices, wherein the first subset of session content is different from the second subset of session content. The session host device may selectively share content received from some participants with other participants in the online session. The host session device may also record different types of session content separately but synchronized in time, wherein the different types of session content include at least two of audio, video, text, and graphic content.

According to a feedback cancellation feature, location information may be obtained for a plurality of participant devices. Then audio signals may be received over a plurality of different streams of session content from the plurality of participant devices. The session host may then transmit the received audio signals to other session participant devices except to those participant devices that have been identified as being in close proximity to a participant device from which a particular audio signal originated. The proximity to the participant device may also be inferred from the use of the same participant account by two devices.

According to another feature, location the host device may request payment from session participant devices via a web-based participant interface. Transmission of a subset of session content may be restricted to only participant devices from which payment is received.

According to a dynamic session transfer feature, a request may be received from the first device to transfer its session participation to a third device. A stream of session content, previously sent to the first device, may instead be transmitted to the third device.

According to a polling feature, a real-time polling interface is provided to at least a subset of participant devices.

The host device may then receive real-time polling information from the subset of participant devices during the conference session. The session content may thus be adjusted (e.g., presenter/host may elaborate on some session topics) based on the real-time polling information received.

According to a pay-to-ask feature, a plurality of questions may be received from one or more session participant devices. Additionally, offers of payment associated with at least some of the received questions may also be received. The session host may prioritize questions to answer based on the offers of payment, where questions having higher payment offers are given highest priority.

Another aspect provides a method operational at a first device, comprising: (a) joining an online session using a first participant account and a first unique device identifier, the online session having a plurality of participant devices and hosted by a host server over a network, each participant device identified by a participant account and/or a unique device identifier; (b) sending a request for a second device to be added to the online session, the second device using the first participant account and a second unique device identifier to join the online session; (c) receiving a stream of session content from the host server; (d) relaying a sub-stream of session content within the stream of session content to the second device; and/or (e) sending a stream of session content from the first device to the host server, the first stream including separate sub-streams of at least two of audio, video, text, and graphic content captured at the first device.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Exemplary Operating Environment

Figure 1:
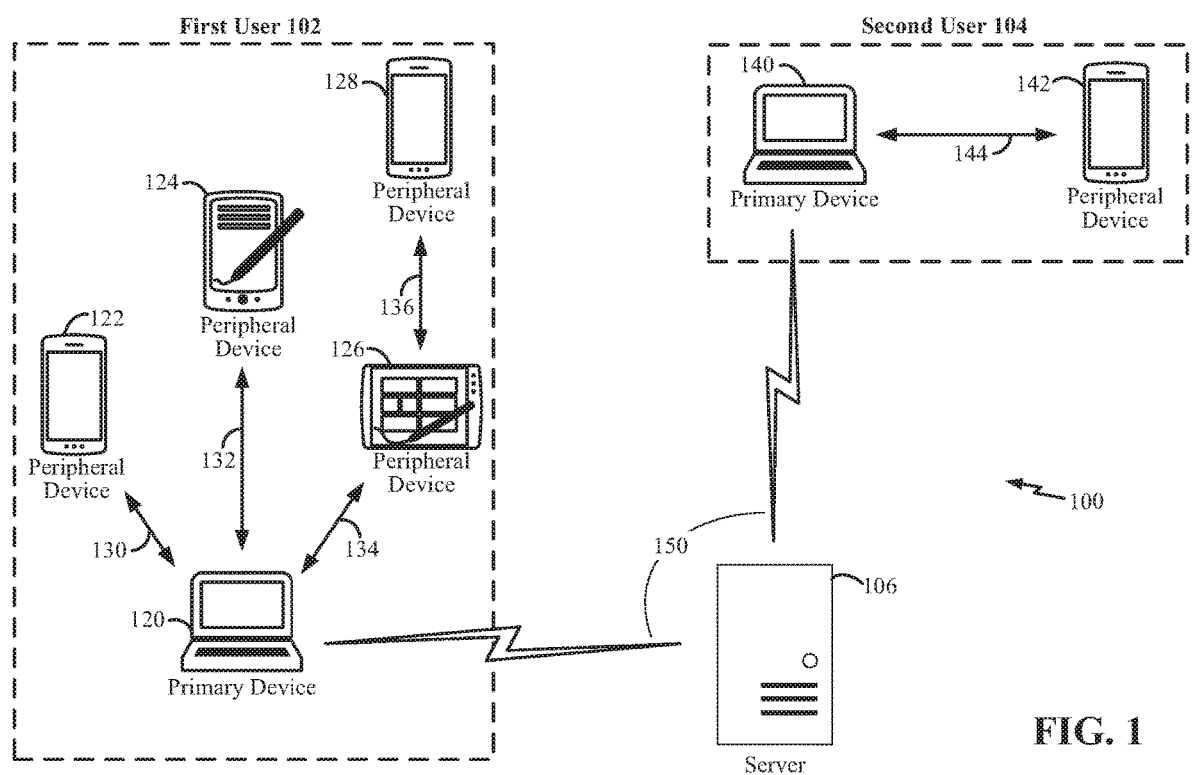
FIG. 1 is a block diagram illustrating an exemplary operating environment for a video conferencing system.

FIG. 1 is a block diagram illustrating an exemplary operating environment for a video conferencing system 100. According to one implementation, the video conferencing system 100 may include a server 106 communicatively coupled to a plurality of users 102 and 104. The server 106 may be one or more computing devices that may be configured to operate a video conference software and/or system which interconnects two or more user devices for a plurality of users 102 and 104. In various examples, the server 106 may communicate with user devices via a wired or wireless network (e.g., internet), a point-to-point link, a mesh network, an adhoc link, etc.

In this example, a first user 102 may utilize a primary device 120 to establish a video conference session through the server 106 with another primary device 140 associated with a second user 104. The primary devices 120 and/or 140 may include, for example, computers, laptops, mobile phones, tablets, digital assistants, etc., which may be configured or configurable to participate in the video conference session through a web-based or network-based service hosted by the server 106. Two or more primary devices 120 and 140 may participate concurrently in the video conference session by communicating with each other using video, voice, and/or text.

The video conference session hosted by the server 106 may be part of or integrated within other applications, such as a social network application/forum, a webinar application/forum, an academic or technical forum, a tutorial application/forum, online transaction forum, etc. According to one example, the video conference may be accessible to participating devices via a browser that accesses a website hosted by the server 106.

Figure 2A:
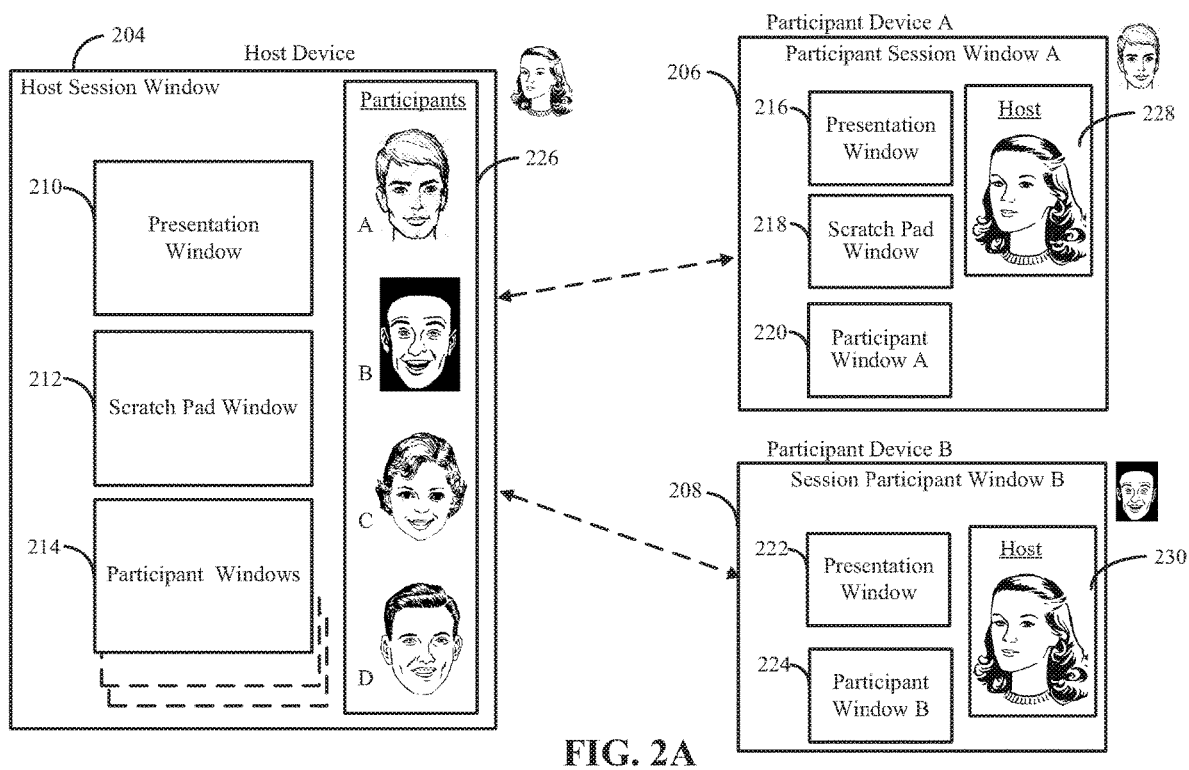
FIG. 2A illustrates an exemplary block diagram of how various windows and content may be selectively shared within a video conference session.

FIG. 2A illustrates an exemplary block diagram of how various windows and content may be selectively shared within a video conference session. In one example, the video conference session and communications between devices/participants may occur through a hosting server (e.g., an online session). A primary/host device (e.g., 120 in FIG. 1) may host a video conference session which includes a session window or interface 204. The host session window 204 may include a presentation window 210, a scratch pad window 212, participant video feeds 226, and/or one or more participant windows 214. One or more of these windows 210, 212, and/or 214 may be selectively shared by the host with one or more participant devices. Additionally, the individual participant video feeds 226 and/or participant windows may also be selectively shared, e.g., by the host or by each participant, with other participants.

In one example, the presentation window 210 at the host device may include content (e.g., text, video, graphics, etc.) to be shared by the host with one or more other participating devices (e.g., session participant devices A and B). The scratch pad window 212 may allow the host to share notes or diagrams with other participant devices 206 and 208. The participant window 220 and/or 224 may allow each participant device 206 and 208 to share content with the host (e.g., documents, graphics, video, etc.). The participant video feeds 226 may allow the host to see a video feed of the participants (e.g., a participant's face, camera view, etc., like a video call).

The host may also selectively share the scratch pad window 218 with some participants or all participants. For instance, one implementation may provide expanded access to content or features for different levels of participants or access privileges. For example, paying participants may be selected by the host to receive some of the windows 210, 212, and 214 while non-paying participants do not receive such windows (or content therein). Additionally, the host may selectively record some or all windows 210, 212, and/or 214 during a session. In this manner, the video conference session may be available for subsequent replay (e.g., with the content, video, audio, etc., synchronized).

Each participant may have a device A or B which displays a participant session window 206 and 208 that includes a presentation window 216 and 222 sent by the host, a participant window 220 and 224, and/or a video feed 228 and 230 sent by the host.

Figure 2B:
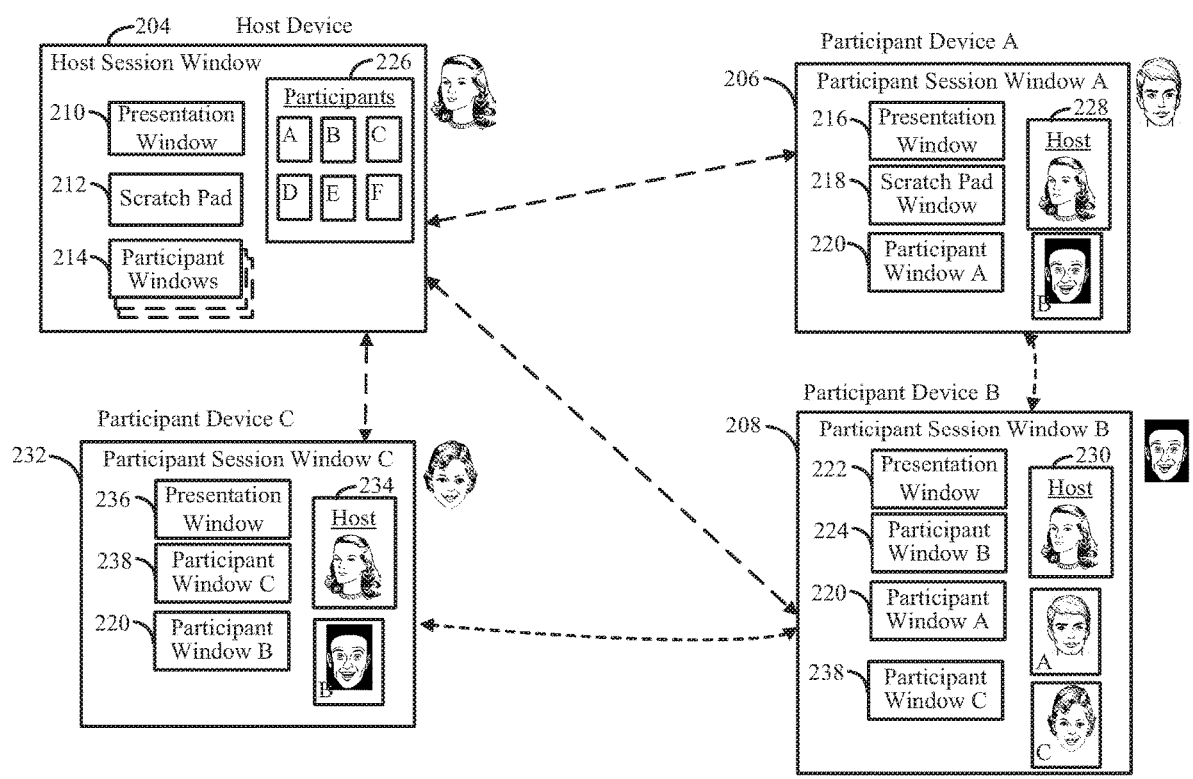
FIG. 2B illustrates another exemplary block diagram of how various windows and content may be selectively shared within a video conference session.

FIG. 2B illustrates another exemplary block diagram of how various windows and content may be selectively shared within a video conference session. This example illustrates a similar operation as described for FIG. 2A, but participant devices A, B, and/or C may share content and/or communicate with each other in a private manner during a conference session. For instance, the host may send its video feed to participant devices A, B, and C which may be displayed in a video feed window 228, 230, and 234.

Additionally, each participant may make its participation in the conference session either public (e.g., where other participants are aware of each other's participation in the conference session) or private (e.g., where other participants do not know "private" participants are part of the conference session). Even in private participation mode, the session host may still know who is participating in a conference session and may be able to communicate with those participants. In some instances, the host may be the only party that is able to communicate with participants who are private. For those participants that make their participation public, other participants (i.e., either public or private themselves) may be able to select/contact them (e.g., via the participant session windows 206, 208 and/or 232) and seek to communicate with them (e.g., audio and/or video) and/or share content. That is, each participant session window 206, 208, and 232 may include the names, identifiers, and/or pictures of participants whose participation is public. This allows each participant to select one or more other participants and request (e.g., via a pull down menu, etc.) to initiate an audio session, video session, and/or content-sharing session. For example, a participant device B may establish a video session (or audio session) with participant devices A and C, while obtaining content from their respective participant windows 220 and 238. In turn, participant device B may choose to share its participant window 220 with participant device C, but not with participant device A. In this manner, participants to a conference session may hold private conversations with one another and separate from the conference session (e.g., without other conference participants knowing or listing).

In yet an alternative feature, a participant who is participating private mode may nonetheless be able to initiate and establish an individual sessions or group sessions with other selected participants of the conference session.

According to one aspect, the conference session host may control whether any or some participants are provided the option to contact and/or establish communications with other participants. For instance, the session host may prevent a participant list from being shown/displayed in any of the participant session windows 206, 208, 232. Alternatively, even when the participant list is shared with some or all other session participants, the session host may withhold the ability/option for some or all participants to contact or connect with each other through the conference session.

In yet another feature, the session host may control which participant(s), if any, are able to speak or provide audio, video, or content to the conference session. For instance, the session host may prevent all participants from speaking during the conference session or may selectively choose which participant(s) may speak at any time during a conference session.

Dynamic Platform Extendibility

According to one aspect, users may dynamically extend their video conference session presence onto other devices.

For example, referring again to FIG. 1, the first user 102 may have joined the video conference session (e.g., via a website) from its primary device 120. During the video conference session, the first user 102 may wish to add a second camera or share a screen with other participants of the video conference session. Having the ability to dynamically add devices to an established or ongoing video conference session allows users to expand their video conference session capabilities to one or more peripheral devices 122, 124, 126, 128, and/or 142 via wired or wireless links 130, 132, 134, 136, and/or 144. In some implementations, a user 102 or 104 may, for example, add a peripheral device 122, 124, 126, 128, and/or 142 to add an additional camera, share a work screen (e.g., for documents, or drawings), add an additional microphone and/or speaker, or to move the video conference session from a first device to a second device. For instance, by extending the video conference session from a desktop device to a mobile device, a user may be able to continue the video conference session without interruption as he/she travels or moves. In another example, a user may wish to share an idea or document and thus may add a peripheral device (e.g., tablet, screen, etc.) to the video conference session through which the user can share such idea or document with other participant(s).

Figure 3A:
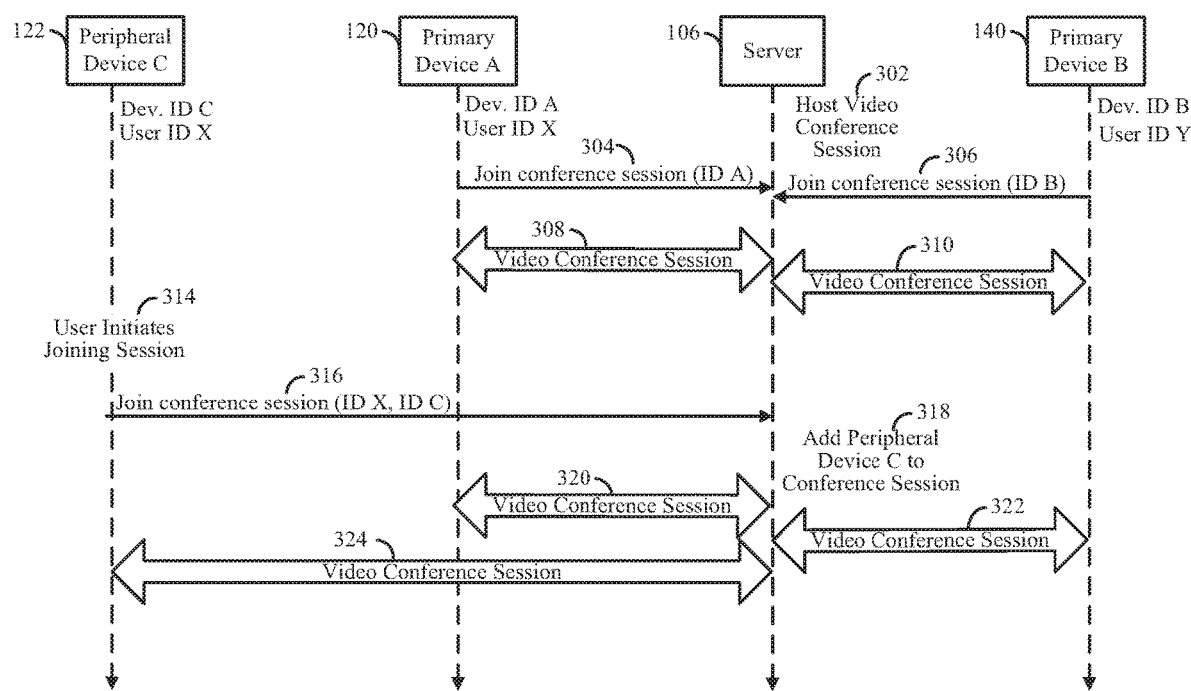
FIG. 3A is a block diagram illustrating a first example of how a user may add a peripheral device to an established or ongoing video conference session.
Figure 3B:
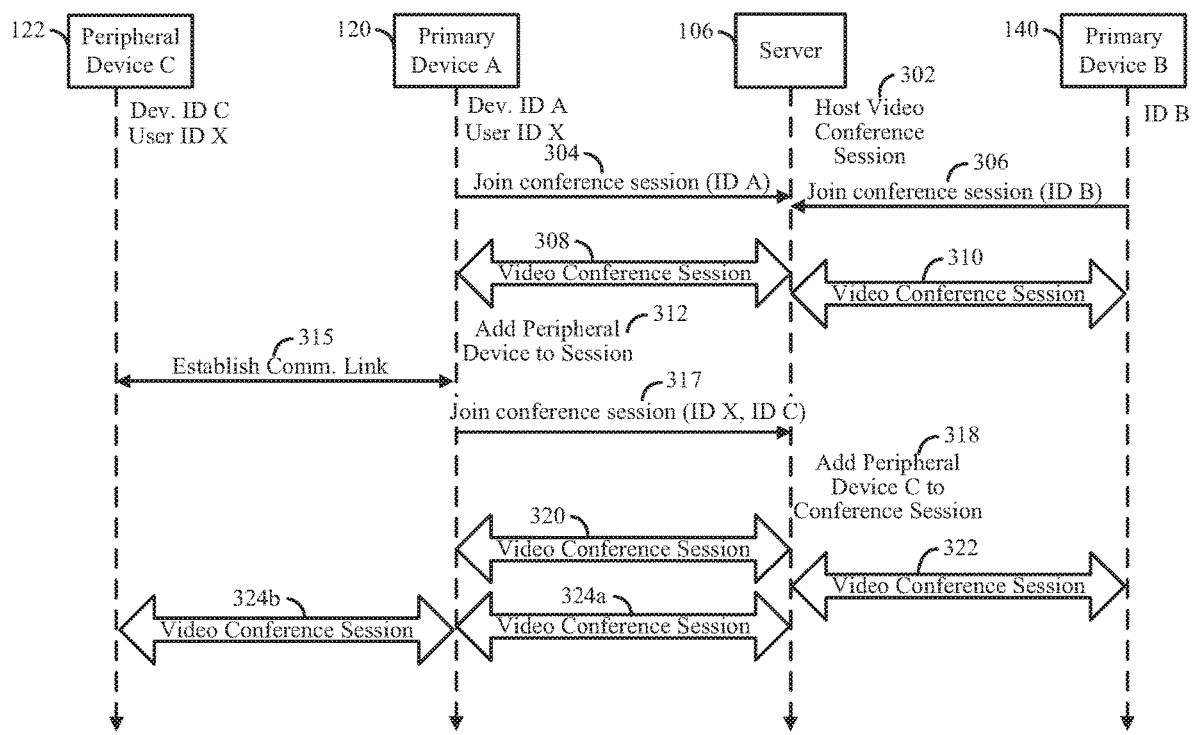
FIG. 3B is a block diagram illustrating a second example of how a user may add a peripheral device to an established or ongoing video conference session.
Figure 3C:
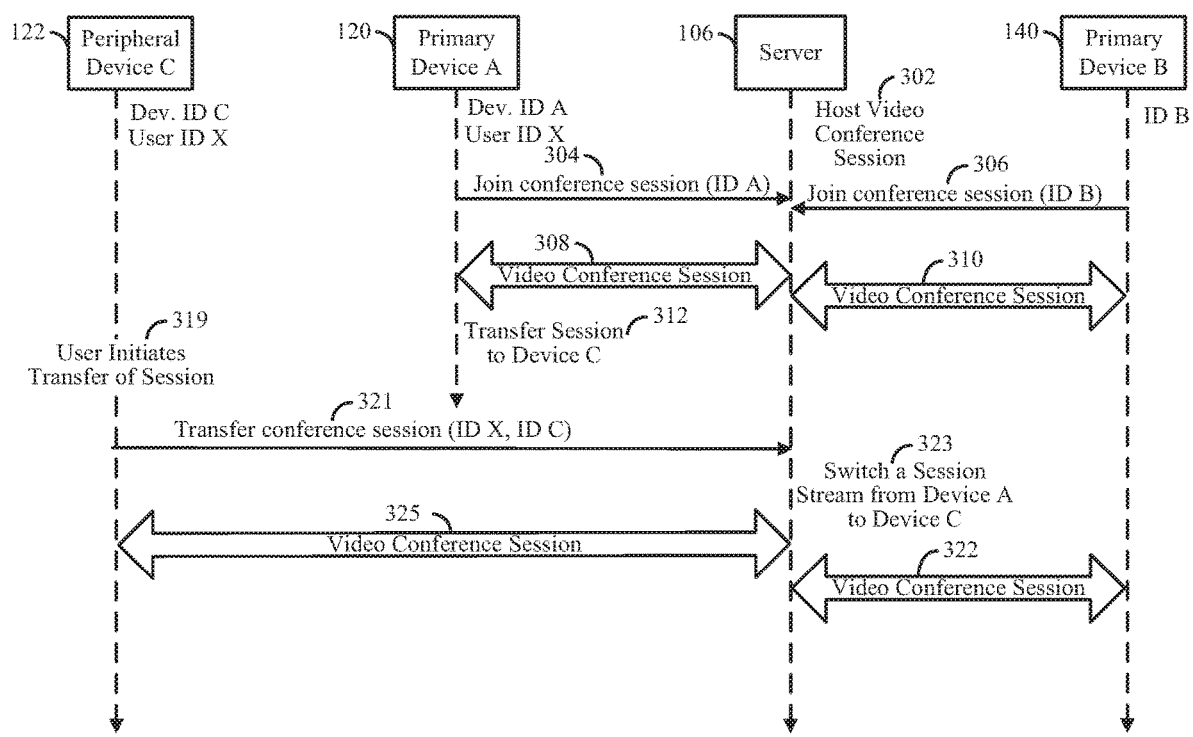
FIG. 3C is a block diagram illustrating an example of how a user may dynamically transfer an established or ongoing video conference session from a first device to a second device.

FIGS. 3A, 3B, and 3C illustrate various examples of how a device may be added to an established or ongoing video conference session.

FIG. 3A is a block diagram illustrating a first example of how a user may add a peripheral device to an established or ongoing video conference session. The server 106 may host a video conference session 302 which has been joined 304 and 306 by the primary devices 120 and 140 using corresponding unique device identifiers (e.g., ID A, ID B) and/or unique user/participant/account identifiers (e.g., ID X, ID Y). Once a device has joined the video conference session 302, the server 106 may transmit individual streams 308 and 310 (e.g., data, audio, video, etc.) to each participating device 120 and 140. The individual streams 308 and 310 may be bi-directional streams, with data, audio, and/or video being transmitted from the server 106 to the primary/peripheral devices 120 and 140, and from the primary/peripheral devices 120 and 140 to the server 106.

While the video conference session is still active, a first participating device A 120 (or user thereof) may seek to add a peripheral device C 122. Adding the peripheral device 122 to the existing video conference session 302 may permit a user of the first participating device A 120 to add a camera or share a document on an as-needed basis.

Various methods of adding a peripheral device to a previously established video conference are contemplated herein. In one example, the user of the first participating device A 120 may initiate joining 314 of the session by using the same user/participant/account identifier (User ID X) as used with the primary device A 120 and/or using the device identifier C for the peripheral device C 122. In one example, the peripheral device C 122 may simply pull up a website for the conference session and logs into the session. For instance, the peripheral device C 122 may send a message or request to join 316 the conference session using the user/participant/account identifier (User ID X). To distinguish the peripheral device C 122 from the primary device A 120, the server 106 may use the unique device identifiers ID A and ID C. Upon receipt of the join request 316 from the peripheral device C 122, the server 106 may add 318 the peripheral device C 122 to the video conference session. In this example, individual and separate video session streams 320, 322, and 324 may be transmitted concurrently to all devices 120, 122, and 140 that are participating in the video conference session. Note that by having individual and separate streams 320, 322, and 324 for each device that participates in the video conference session, the bandwidth of each stream may be tailored to the capabilities of each participating device.

In one implementation, the peripheral device C 122 may use the user/participant identifier ID X (e.g., a user account, participant account) to join the conference session, while the unique device identifier ID C is used to distinguish between the devices associated with a particular user/participant identifier. Such user/participant identifier ID X may be the same user/participant identifier being used by the first participating device A 120.

According to one aspect, when the peripheral device C 122 is added to the video conference session, this is done using an account identifier associated with a user for the primary device A 120. That is, even though a primary device A 120 may add multiple peripheral devices to the video conference session, they may all be using the same user/participant/account identifier (but using different device identifiers). This permits a user to extend any video conference session to multiple devices and also to move the video conference session from a stationary device to a mobile device (or vice versa) as desired. Thus, a single user associated with the participant account may dynamically add multiple devices to an ongoing conference session, thus extending the resources available to the user during such conference session.

FIG. 3B is a block diagram illustrating a second example of how a user may add a peripheral device to an established or ongoing video conference session. This approach is similar to that illustrated in FIG. 3A but the peripheral device C 122 is added by and through the primary device A 120. In this example, the primary device A 120 may act as a relay (e.g., through a short range or local link) for the video conference session stream to/from the peripheral device C 122. That is, the primary device A 120 may initiate addition of a peripheral device to the session 312. In this case, the peripheral device C 122 may not have a network communication link to the server 106 or may not have the resources to initiate such connection. Instead, the primary device A 120 may establish a communication link 315 (e.g., a short range link such as Bluetooth) and then registers the peripheral device C 122 with the server 106 by sending a join conference session message 317 which may identify the user/participant identifier ID X and/or the device identifier ID C. A separate video session stream 324a may be transmitted between the server 106 and the primary device A 120 which is then relayed 324b between the primary device A 120 and the peripheral device C 122.

FIG. 3C is a block diagram illustrating an example of how a user may dynamically transfer an established or ongoing video conference session from a first device to a second device. This approach is similar to that illustrated in FIG. 3A where a user joins the session through device A 120 using user/participant identifier X. However, the user may initiate transfer the session 319 from device A 120 to device C 122. For instance, the user may log into a website on the server 106 from device C 122, using the user/participant identifier X, and request that the session be transferred 321 to device C 122. The server 106 may then switch 323 the session stream from device A to device C. That is, a video conference session stream 325 is established between the server 106 and device C 122.

Exemplary Session Hosting Server and Method Operational Thereon

Figure 4:
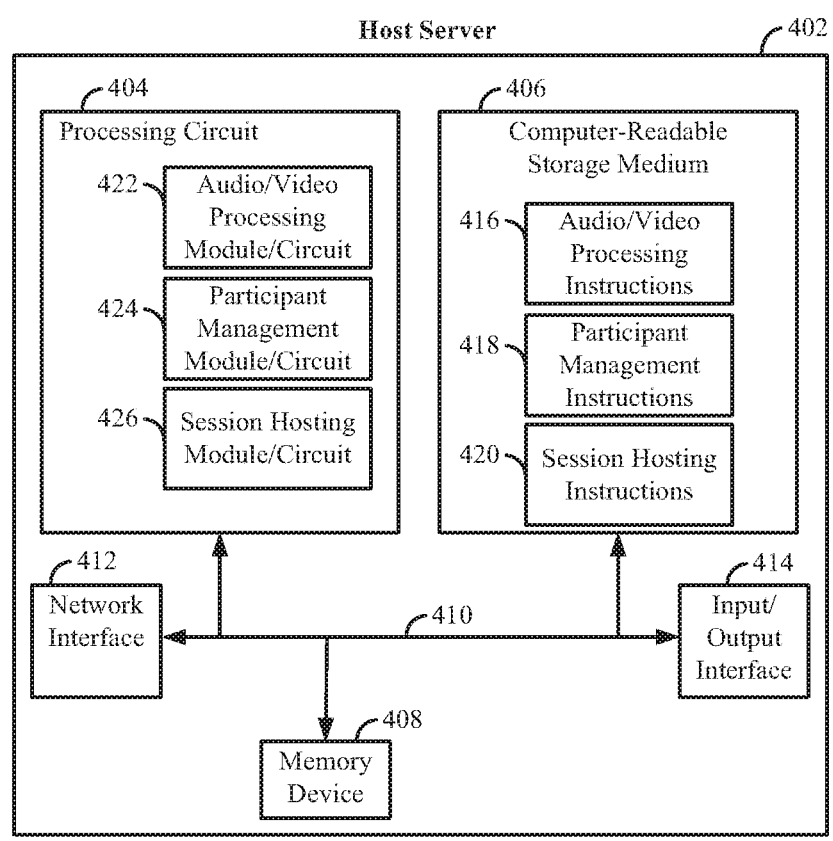
FIG. 4 illustrates an exemplary server that may be configured to host one or more online sessions (e.g. video, audio, and/or graphics) among a plurality of participants while facilitating dynamic expansion of session resources initiated by each individual participant.

FIG. 4 illustrates an exemplary server that may be configured to host one or more online sessions (e.g. video, audio, and/or graphics) among a plurality of participants while facilitating dynamic expansion of session resources initiated by each individual participant. The host server 402 may include a processing circuit 404 (e.g., one or more processors) coupled (e.g., via a bus 410, etc.) to a computer readable storage medium 406, a memory device 408, a network interface 412 (e.g., wired and/or wireless network), and/or an input/output interface 414 (e.g., monitor, keyboard, etc.). In one example, the computer-readable storage may include audio/video processing instructions 416 to perform audio/video processing for conferencing sessions, participant management instructions 418 to manage session participant access to conference sessions, and session hosting instructions 420 to facilitate hosting of audio/video conference sessions (e.g., a website that streams data, audio, and/or video among session participants). The processing circuit 404 may be configured to perform one or more functions of the instructions stored in the computer-readable storage medium 406. For instance, the processing circuit may include an audio/video processing module/circuit 422, a participant management module/circuit 424, and/or a session hosting module/circuit 426.

Figure 5:
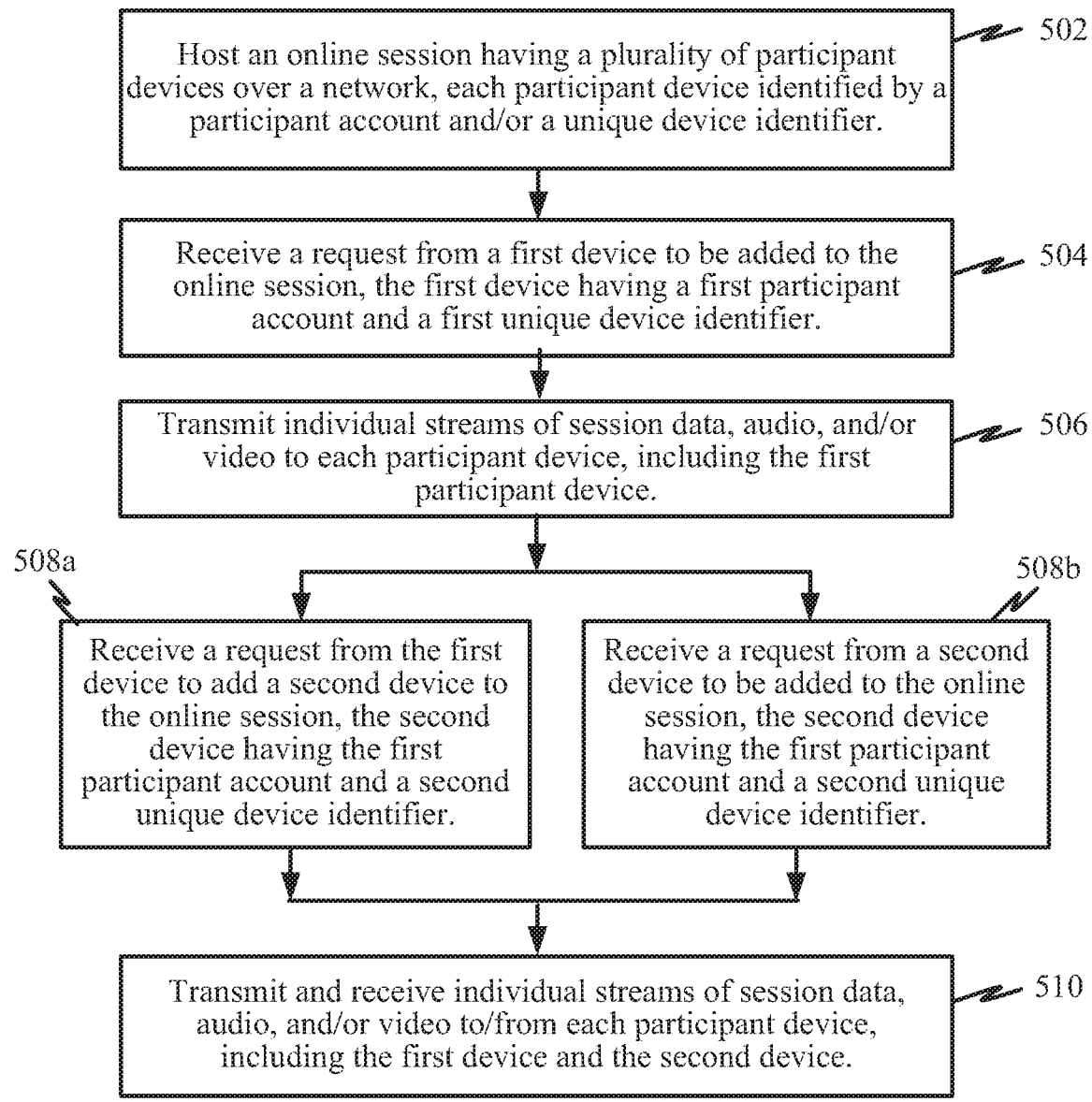
FIG. 5 illustrates an exemplary method for hosting a multi-participant online session on a server while facilitating dynamic expansion of session resources initiated by each individual participant.

FIG. 5 illustrates an exemplary method for hosting a multi-participant online session on a server while facilitating dynamic expansion of session resources initiated by each individual participant. An online session (e.g., a website session hosting video, audio, data, etc.), having a plurality of participants, may be hosted over a network, each participant device identified by a participant account and/or a unique device identifier 502. A request may be received from a first device to be added to the online session, the first device having a first participant account (e.g., user identifier or account), and a first unique device identifier 504. The first participant account may be a unique account or number associated with a user of the first device. The server may then transmit individual streams of session data, audio, and/or video to each participant device, including the first participant device 506. Subsequently, the server may receive a request to add a second device to the online session. In one instance, the server may receive a subsequent request from the first device to add a second device to the online session, the second device having the first participant account and a second unique device identifier 508a. In another implementation, the server may receive a subsequent request from the second device to be added to the online session, the second device having the first participant account and a second unique device identifier 508b. In one example, such requests may simply be login requests through a website providing access to the online session. Note that by using the credentials (e.g., first participant account associated with the first device or user thereof), the server is able to verify whether or not the second device can/should be added to the online session. The server may then transmit and receive individual streams of session data, audio, and/or video to/from each participant device, including the first device and the second device 510. In an alternative embodiment, the first device and second device may receive a single combined stream of the online session, although this may degrade or reduce the bandwidth allocated to each of the first and second devices.

In this manner, a user of the first device may add additional devices (e.g., second device) to expand the input and/or output capabilities or to transfer the online session from one device to another. For instance, in one implementation, the first device may permit the user to send and receive audio and video for the session, while the second device may allow the user to share a document or work screen.

In another example, the first device may request (e.g., through a message or a website interface of the host server) to transfer an ongoing session from the first device to the second device. Upon receiving such request, the host server may send a link or message to the second device so that it may take over the online or web-based session from the first device.

In some implementations, the first device and second device may each have separate and/or independent connections/links to the host server. In other implementations, only the first device may have a connection to the host server, but acts as a relay for the second device to transmit session audio, video, and/or data between the server and the second device.

Exemplary Primary Device and Method Operational Thereon

Figure 6:
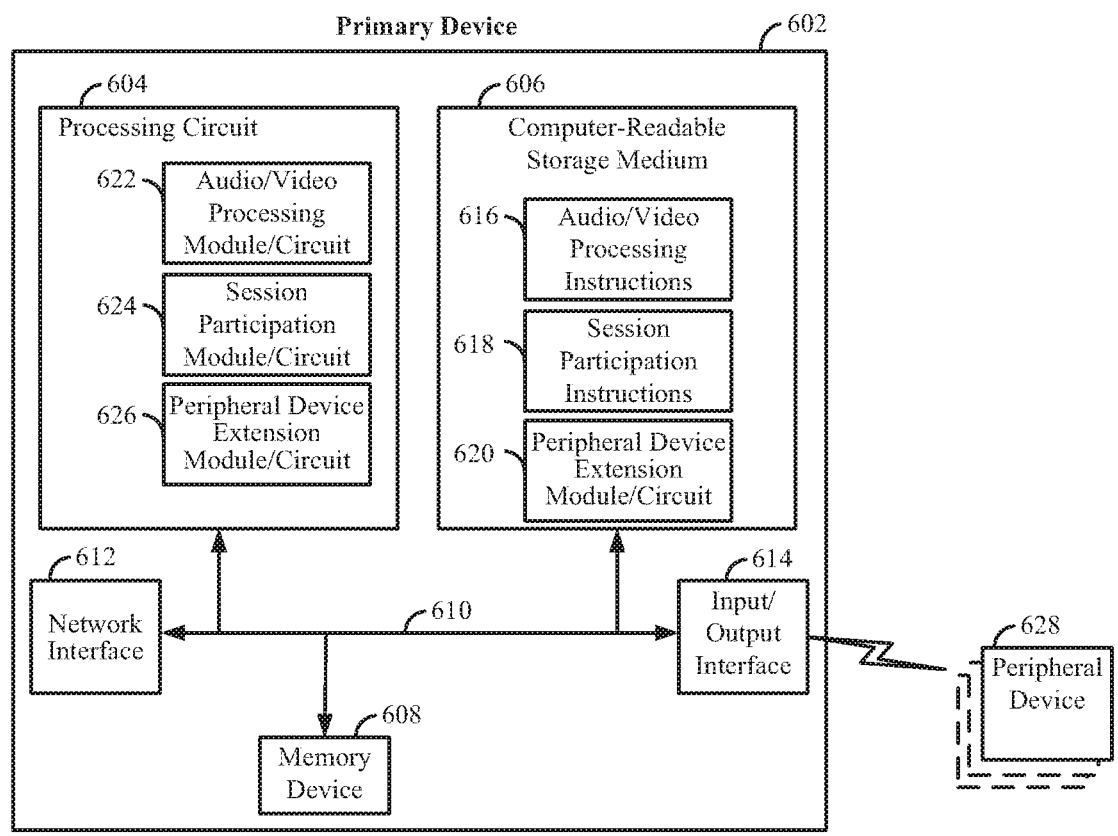
FIG. 6 illustrates an exemplary primary device that may be configured to participate in online sessions (e.g. video, audio, and/or graphics) as well as dynamically extend the online session to other peripheral devices.

FIG. 6 illustrates an exemplary primary device that may be configured to participate in online sessions (e.g. video, audio, and/or graphics) as well as dynamically extend the online session to other peripheral devices. The primary device 602 may include a processing circuit 604 (e.g., one or more processors) coupled (e.g., via a bus 608, etc.) to a computer readable storage medium 606, a memory device 608, a network interface 612 (e.g., wired and/or wireless network), and/or an input/output interface 614 (e.g., monitor, keyboard, short range wireless etc.). In one implementation, the primary device 602 may use the network interface 612 to communicate with a host server and may use the input/output interface 612 (e.g., a wireless interface) to communicate with one or more nearby peripheral devices 628. In one example, the computer-readable storage may include audio/video processing instructions 616 to perform audio/video processing for conferencing sessions, session participation instructions 618 to join and participate in conferencing sessions, and peripheral device session extension instructions 620 to add peripheral devices to the conference sessions. In one example, the session participation instructions 618 may include a web browser to access a website hosting the online session. The processing circuit 604 may be configured to perform one or more functions of the instructions stored in the computer-readable storage medium 606. For instance, the processing circuit 606 may include an audio/video processing module/circuit 622, a session participation module/circuit 624, and/or a peripheral device session extension 626.

Figure 7:
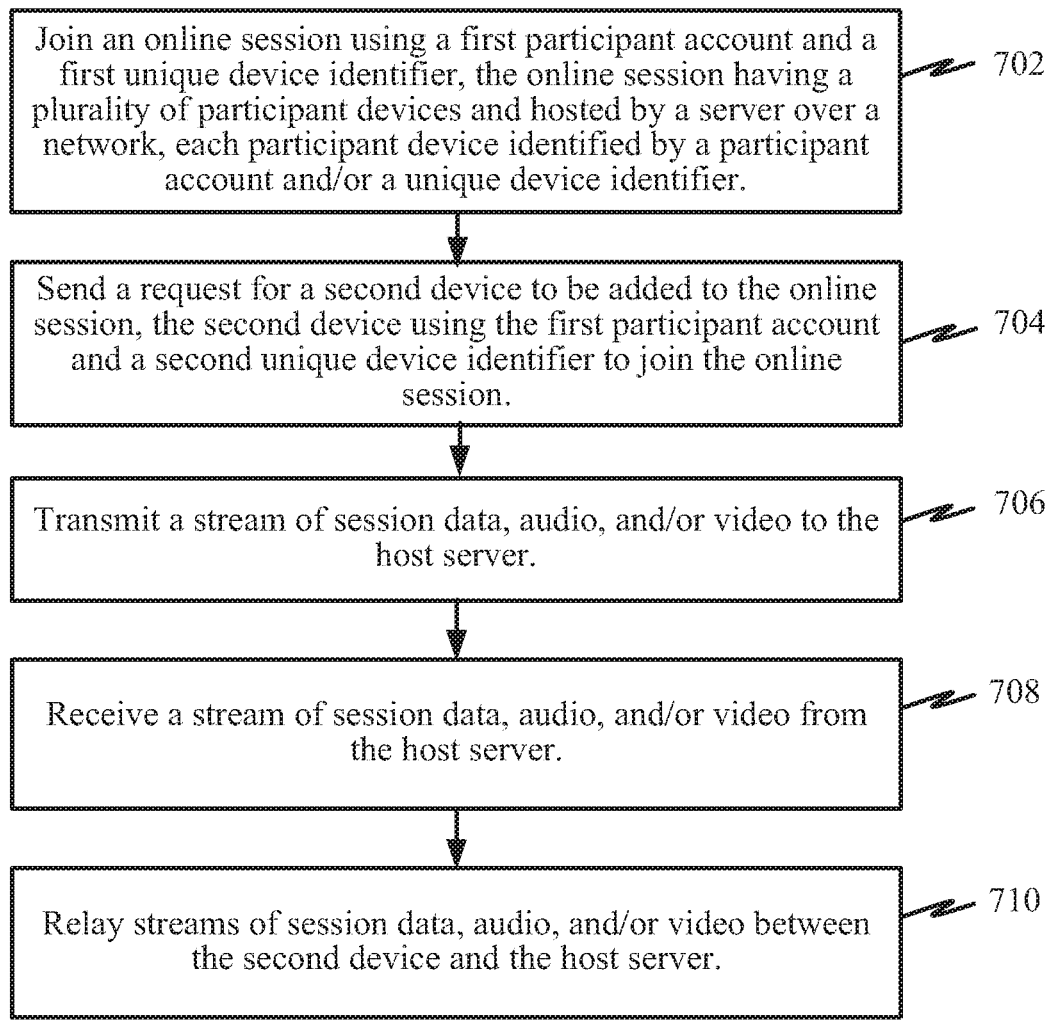
FIG. 7 illustrates an exemplary method that operational at a primary device to participate in online sessions (e.g. video, audio, and/or graphics) as well as dynamically extending the online session to other peripheral devices.

FIG. 7 illustrates an exemplary method that operational at a primary device to participate in online sessions (e.g. video, audio, and/or graphics) as well as dynamically extending the online session to other peripheral devices. The primary device may join an online session using a first participant account and a first unique device identifier, the online session having a plurality of participant devices and hosted by a server over a network, each participant device identified by a participant account and/or a unique device identifier 702. The first device may subsequently send a request for a second device to be added to the online session, the second device using the first participant account and a second unique device identifier to join the online session 704. In various implementations, the request to add the second device may be sent to the host server, the second device, or both. In the case where the request is sent to the second device, the second device may use such request to then contact the host server to join the online session. In the case where the request is sent to the host server, the host server may contact or grant access to the second device to join the online session. By using the same first participant account as the first device, the second device (e.g., a peripheral device) may have the same restrictions or privileges as the first device (or user of the first device). However, even though the same first participant account is being used by the first and second devices, the host server can distinguish between the two since they utilize distinct device identifiers (e.g., first unique device identifier and second unique device identifier).

The primary device may transmit a stream of session data, audio, and/or video to the host server 706. Such stream may be a digital packet stream for example. The primary device may also receive a stream of session data, audio, and/or video from the host server 708.

In one implementation, the first device may also relay streams of session data, audio, and/or video between the second device and the host server 710. For instance, the primary device may use a short range or local link to communicate to/from the second device, and a network interface to communicate to/from the host server. The streams between the first device and host server may be used to also transmit/receive the audio, video, and/or data for the session to/from the peripheral device. For instance, the streams of session data, audio, and/or video to/from the peripheral device may be encoded or interleaved within the streams transmitted between the first device and the host server.

Exemplary Peripheral Device and Method Operational Thereon

Figure 8:
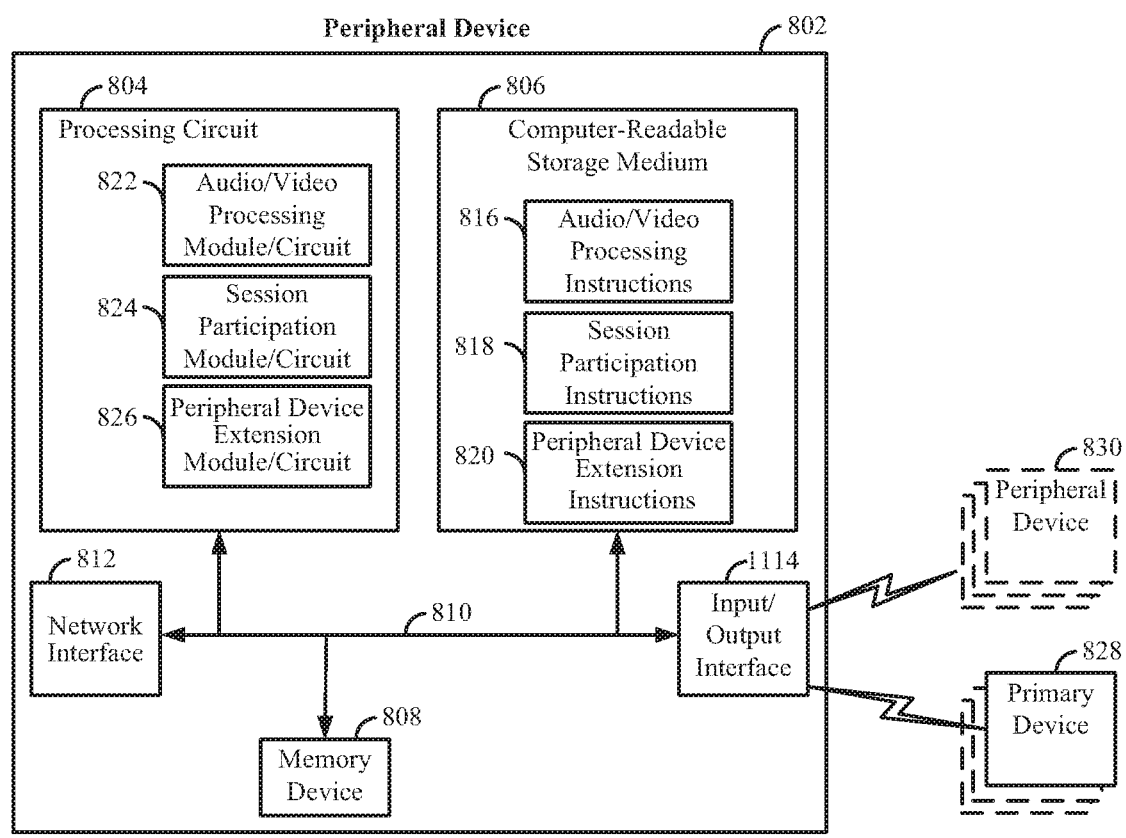
FIG. 8 illustrates an exemplary peripheral device that may be configured to participate in online sessions (e.g. video, audio, and/or graphics) by being dynamically added to the online session from a primary device.

FIG. 8 illustrates an exemplary peripheral device that may be configured to participate in online sessions (e.g. video, audio, and/or graphics) by being dynamically added to the online session from a primary device. Various examples of peripheral devices may include digital tablets, cameras, phones, laptop computers, application-specific consoles, set-top boxes, etc. The peripheral device 802 may include a processing circuit 804 (e.g., one or more processors) coupled (e.g., via a bus 808, etc.) to a computer readable storage medium 806, a memory device 808, a network interface 812 (e.g., wired and/or wireless network), and/or an input/output interface 814 (e.g., monitor, keyboard, short range wireless etc.). In one implementation, the peripheral device 802 may use the network interface 812 to communicate with a host server directly. Alternatively, the peripheral device 802 may use the input/output interface 812 (e.g., a wireless interface) to communicate with a nearby primary device 828 or one or more nearby peripheral devices 830. In one example, the computer-readable storage may include audio/video processing instructions 816 to perform audio/video processing for conferencing sessions, session participation instructions 818 to join and participate in conferencing sessions, and peripheral device session extension instructions 820 to add other peripheral devices to the conference sessions. In one example, the session participation instructions 818 may include a web browser to access a website hosting the online session. The processing circuit 804 may be configured to perform one or more functions of the instructions stored in the computer-readable storage medium 806. For instance, the processing circuit 806 may include an audio/video processing module/circuit 822, a session participation module/circuit 824, and/or a peripheral device session extension 826.

Figure 9:
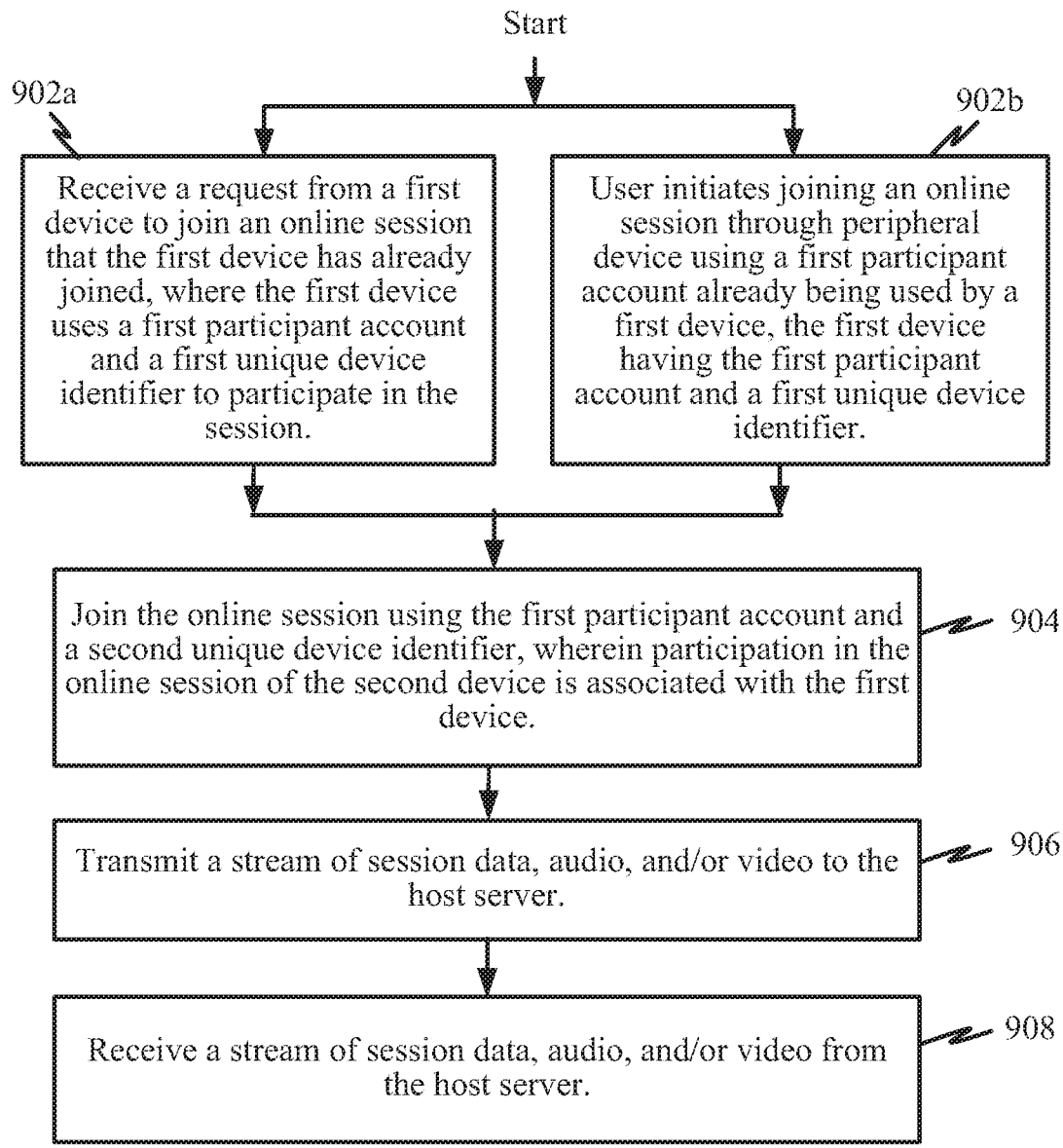
FIG. 9 illustrates an exemplary method that operational at a peripheral device to participate in online sessions (e.g. video, audio, and/or graphics) by being dynamically added to the online session from another device.

FIG. 9 illustrates an exemplary method that operational at a peripheral device to participate in online sessions (e.g. video, audio, and/or graphics) by being dynamically added to the online session from another device. The peripheral device may join an online session by either being invited by a first device or being invited by a host server. In one implementation, the peripheral device may receive a request from a first device to join an online session that the first device has already joined, where the first device uses a first account and a first unique device identifier to participate in the session 902*a*. In an alternative implementation, a user of the peripheral device may initiate joining an online session using a first participant account already being used by a first device, the first device having the first participant account and a first unique device identifier 902*b*.

The peripheral device may then join the online session using the first participant account and a second unique device identifier, wherein participation in the online session of the second device is associated with the first device 904. For instance, the peripheral device may send a session join request to the host server along with the first participant account and the second unique device identifier. By using the same first account as the first device, the peripheral device may have the same restrictions or privileges as the first device (or user of the first device) during the online session.

The peripheral device may transmit a stream of session data, audio, and/or video to the host server 906. Such stream may be a digital packet stream for example. The primary device may also receive a stream of session data, audio, and/or video from the host server 908.

In one use case, the online session may be hosted through a website, for example, where each user may use a participant (user) account to join the online session (e.g., by logging into the website). The unique device identifier may serve to distinguish between two devices using the same participant account. Separate streams may serve to transmit the session between each device and the host server.

In one example, dynamic extension of a session onto another device may include adding a peripheral device, such as a mobile phone, tablet, touchscreen television or monitor, which can be used to make and share a drawing, document, and/or picture during the session.

In another example, dynamic extension of a session onto another device may include adding a peripheral device, such as a device with a camera, which can serve to capture and share additional visual perspectives, objects, etc., than may be provided by a primary device during the session.

In another example, dynamic extension of a session onto another device may include capturing audio from a first device but using video from a second device, while automatically synchronizing the audio and video captures using audio signals from both devices during the session.

Dynamic Audio Filtering Using Location Information

In some implementations, multiple participant devices of an online session may be physically located near each other. For instance, such multiple participant devices may have logged into the same session using different participant accounts, or the same participant account (e.g., primary device and peripheral device). In some cases, such multiple participant devices may include audio microphones, to capture audio signals, and/or speakers to play received audio. Having multiple microphones and speakers from different devices in close proximity may result in audio feedback, which is undesirable in a conference session. While noise cancellation may be implemented on a device-by-device basis, this process is resource intensive.

One aspect provides for devices participating in a session to provide location information (e.g., global positioning, or based IP address, etc.) to the hosting server. Additionally or alternatively, such location information may be inferred when a peripheral device is added to a session by a primary device. This location information may then be used by a session host (e.g., hosting server) to avoid sending audio captured from a first participating device to other nearby participating devices.

Figure 10:
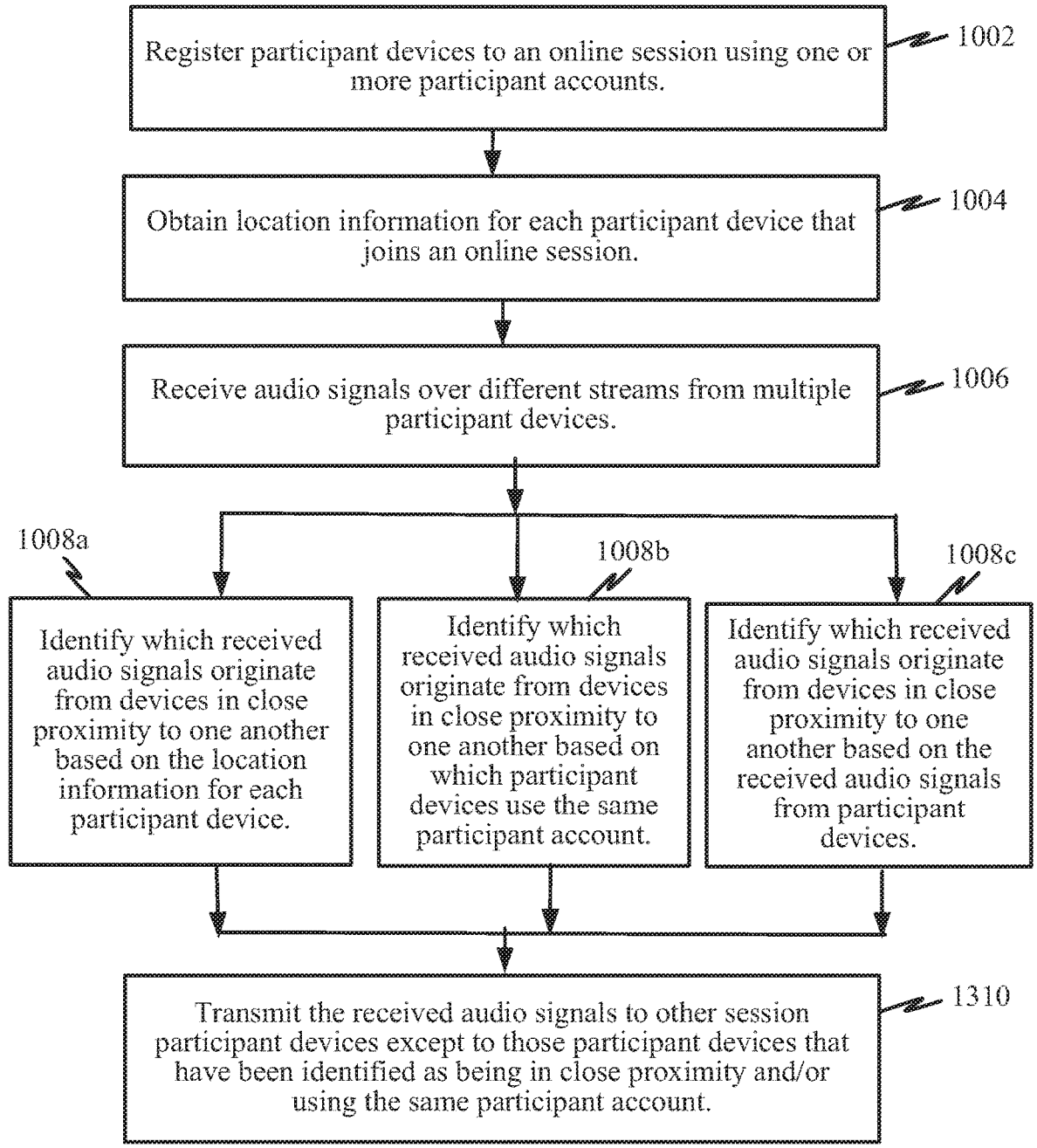
FIG. 10 illustrates a method operational at a session host to reduce audio feedback by using location information to block audio feedback among nearby participant devices of an online session.

FIG. 10 illustrates a method operational at a session host to reduce audio feedback by using location information or account information to block audio feedback among nearby participant devices of an online session. A plurality of participant devices may register to or join an online session using one or more participant accounts 1002. Location information may be obtained for each participant device that joins an online session 1004. The session host may receive audio signals over different streams from multiple participant devices 1006. The session host may then identify which received audio signals originate from devices in close proximity to one another based on the location information for each participant device 1008a. Alternatively, or in addition, the session host may identify which received audio signals originate from devices in close proximity to one another based on which participant devices use the same participant account 1008b. According to yet another alternative approach, the session host may identify which received audio signals originate from devices in close proximity to one another based on the received audio signals from participant devices 1008c (e.g., by use of signal processing to identify correlations/similarities in the received signals).

According to one implementation, upon initiation of a conference session (or joining a conference session), each individual participant device may be configured or directed to generate a test sound or ping (e.g., short sound) through its speaker(s). The host then ascertains whether such test sound or ping is detected by the microphone of any other participant device. That is, nearby participating devices that are transmitting audio signals to the host during the conference session may also capture the test sound or ping. If the test sound or ping is detected by a nearby device, it is forwarded to the session host which can then take action to filter the signal to avoid feedback. In various implementations, the test sound or ping may be a single test signal or may be selected (e.g., by the host or participant) from a plurality of test signals.

Received audio signals during a conference session may be transmitted, by the session host (e.g., host server), to other session participant devices except to those participant devices that have been identified as being in close proximity to the audio signal originator and/or using the same participant account 910. That is, audio signals from two nearby devices or devices using the same account are not forwarded to each other. This effectively eliminates audio feedback among nearby participant devices. Where proximity-based signal filtering (e.g., location-based filtering) or participant account-based signal filtering is used, this saves significant processing resources at the host server relative to the audio signal processing approach.

By performing intelligent audio signal cancellation or filtering, the session host is able to improve the user experience for participants by cancelling or reducing echoes that may be caused by audio signals leaking (e.g., feeding back) from multiple session participant microphone inputs.

Conversion of Free Session to Paid Session

According to another aspect, an online session may be initially provided for free (e.g., at no cost). At some point, to continue with the session, participants may be asked pay some amount, otherwise the session may stop streaming audio, video, and/or data to those participants that do not pay. Alternatively, an online session may provide certain content or features for free but other content or features may require payment. Thus, a subset of session features/content may be available to only participants that pay a requested fee.

Figure 11:
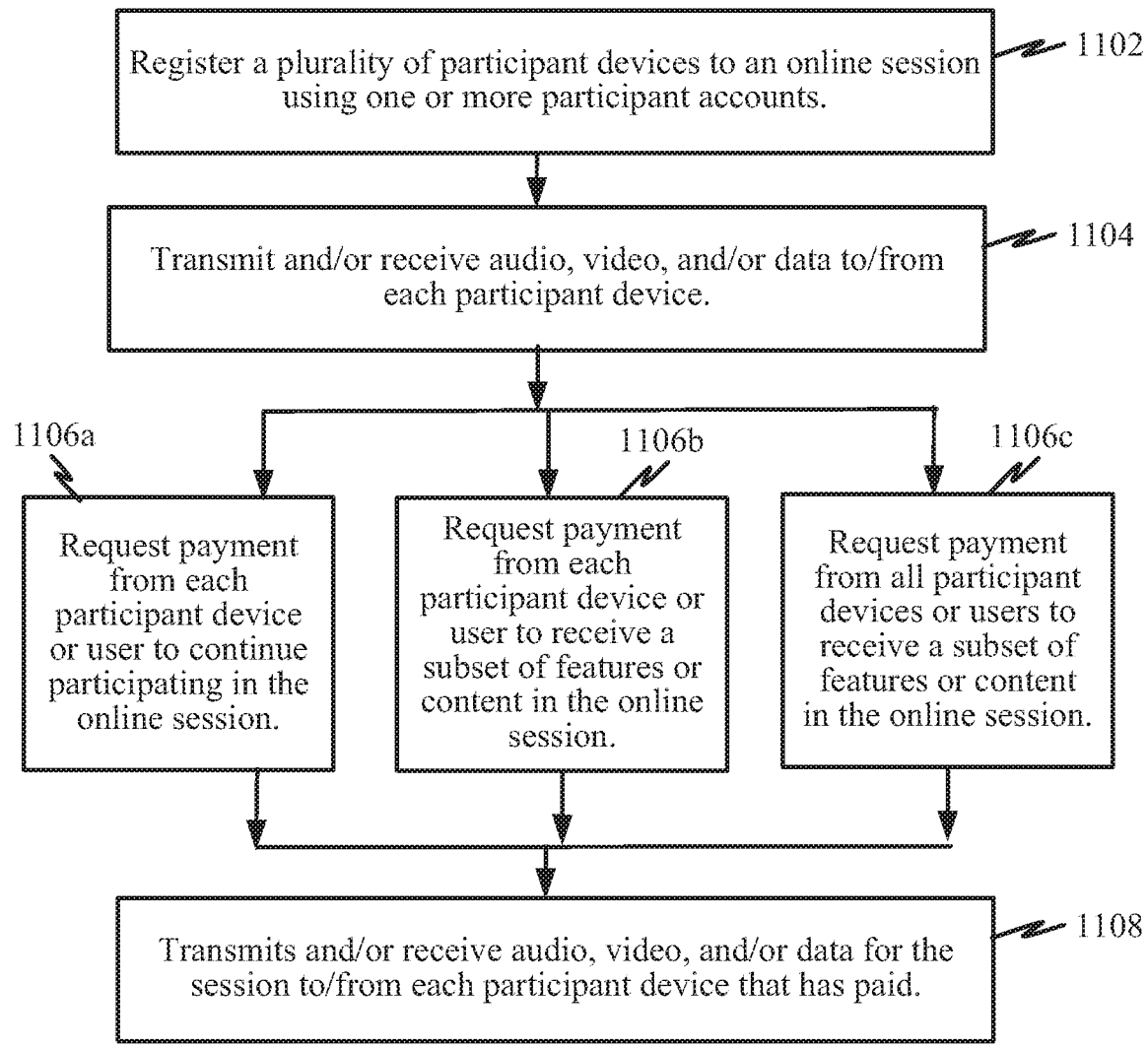
FIG. 11 illustrates a method operational at a session host to convert a free online session to a paid online session.

FIG. 11 illustrates a method operational at a session host to convert a free online session to a paid online session. A plurality of participant devices may register to or join an online session using one or more participant accounts 1102. The session host may thus transmit and/or receive audio, video, and/or data to/from each participant device 1104.

At some point after the online session is started (i.e., after an amount of time or after reaching a certain point in the session), the session host may request payment from each participant device or user to continue participating in the online session 1106a. Additionally or alternatively, the session host may request payment from each participant device or user to receive a subset of features or content in the online session 1106b. That is, only participant devices or users (e.g., determined by the account each device uses to join the online session) that pay will continue to access the session, feature, and/or content. Alternatively, the session host may request payment from all participant devices or users to receive/release a subset of features or content in the online session 1106c. That is, only if the session host receives the requested total payment (e.g., which may be collected from a single or several participant devices or users) does the session host share/release the subset of features to all participants. In some examples, the subset of features may include the ability for a participant to ask a question from the host, to receive certain content from the host, to have a question answered by the host, etc. In yet another alternative, the session host may provide a subset of features or content to all participants if a single participant or a subset of participants pay for such feature (e.g., once a total amount to release a feature or content has been received by the session host, the feature or content is released to all participants). In yet another example, a single participant may pay for a subset of features or content to be provided to a subset of all participants (e.g., a teacher paying for content for students from a single school that are participating in the conference session). In some implementations, the session host may allow some participants to join a session at no cost (e.g., free) while others have to pay for the session content. According to another aspect, the fee/cost to provide access to some session content or feature may be divided amount the number of participants, or (alternatively) a fixed amount may be charged for each participant, or a fixed total amount may be requested from all participants.

The session host may transmit and/or receive audio, video, and/or data for the session to/from each participant device that has paid 1108.

Pay to Ask or Interact within Online Session

During an online session, a host or session leader may have a question and answer portion. However, in the case of a large number of participants, a lot of questions may be asked and it is not easy for the host or session leader to respond to all questions. According to one aspect, the online session may provide a mechanism that allows each participant to ask questions and offer a payment to have such questions answered. Thus, motivated participants may improve their chances of having their questions answered by offering a high payment, and the host or session leader may be paid for responding to such questions.

Figure 12:
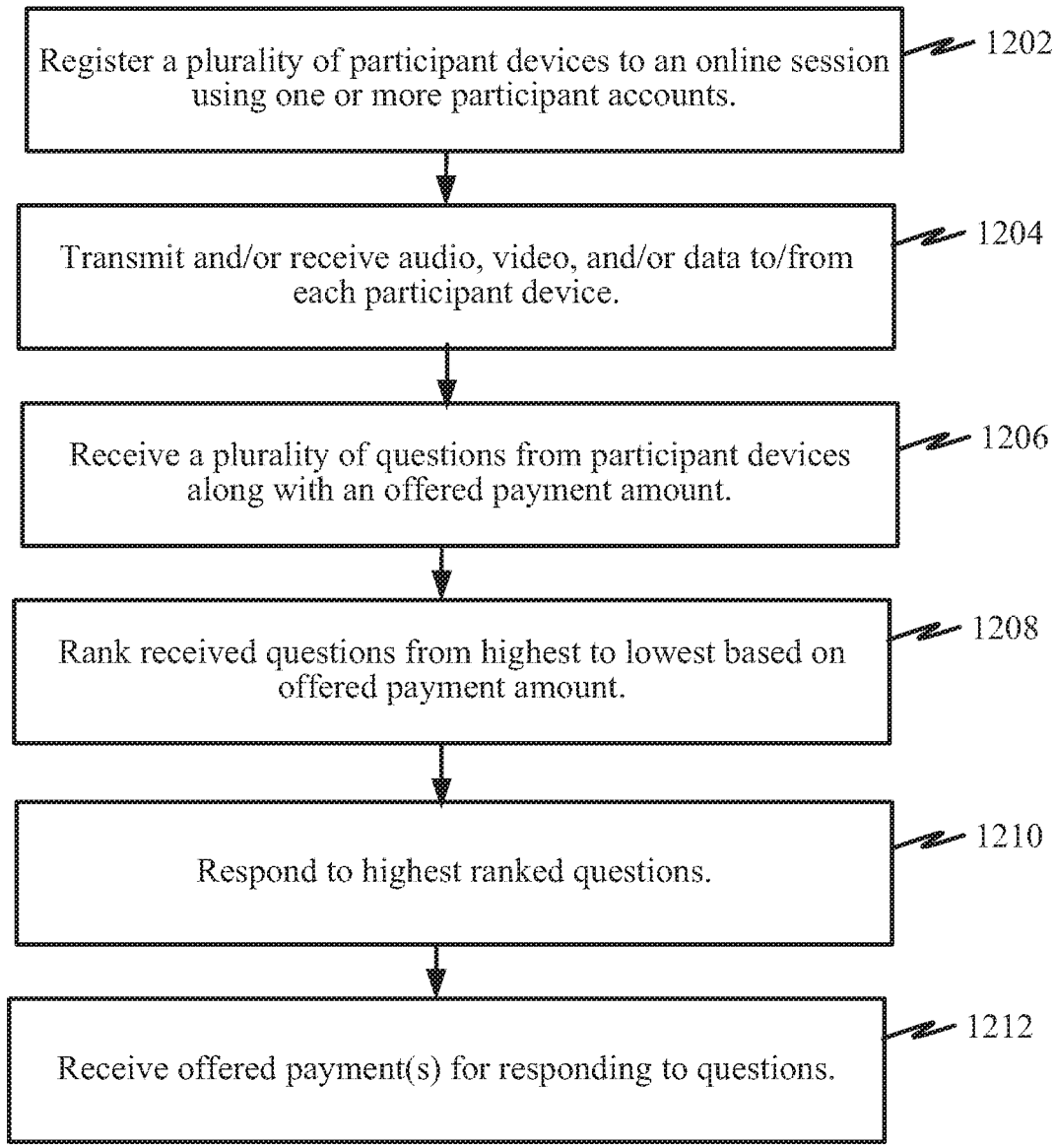
FIG. 12 illustrates a method operational at a session host to receive payment for responding to questions from session participants.

FIG. 12 illustrates a method operational at a session host to receive payment for responding to questions from session participants. A plurality of participant devices may register to or join an online session using one or more participant accounts 1202. The session host may transmit and/or receive audio, video, and/or data to/from each participant device 1204. The session host may receive a plurality of questions from participant devices along with an offered payment amount 1206. For instance, such questions may be posed in writing, voice clip, and a live caller audio queue where a participant can ask the question. The session host may rank the received questions from highest to lowest based on offered payment amount 1208. The session host may then respond to highest ranked questions 1210 and receives the offered payment(s) for responding to the questions 1212.

Call/Session Transfer Between Devices

In some instances, an online session participant may wish to transfer a session from a first device to a second device. For instance, the user may wish transfer participation from an initial device (e.g., running out of battery or lacking in capabilities, etc.) to a different device (e.g., having more battery/power, or having different capabilities, etc.). According to one aspect, the online session host (e.g., website hosting the session) may facilitate transferring of an ongoing session from the first device to the second device so that a user or participant may continue the call even when they move.

Figure 13:
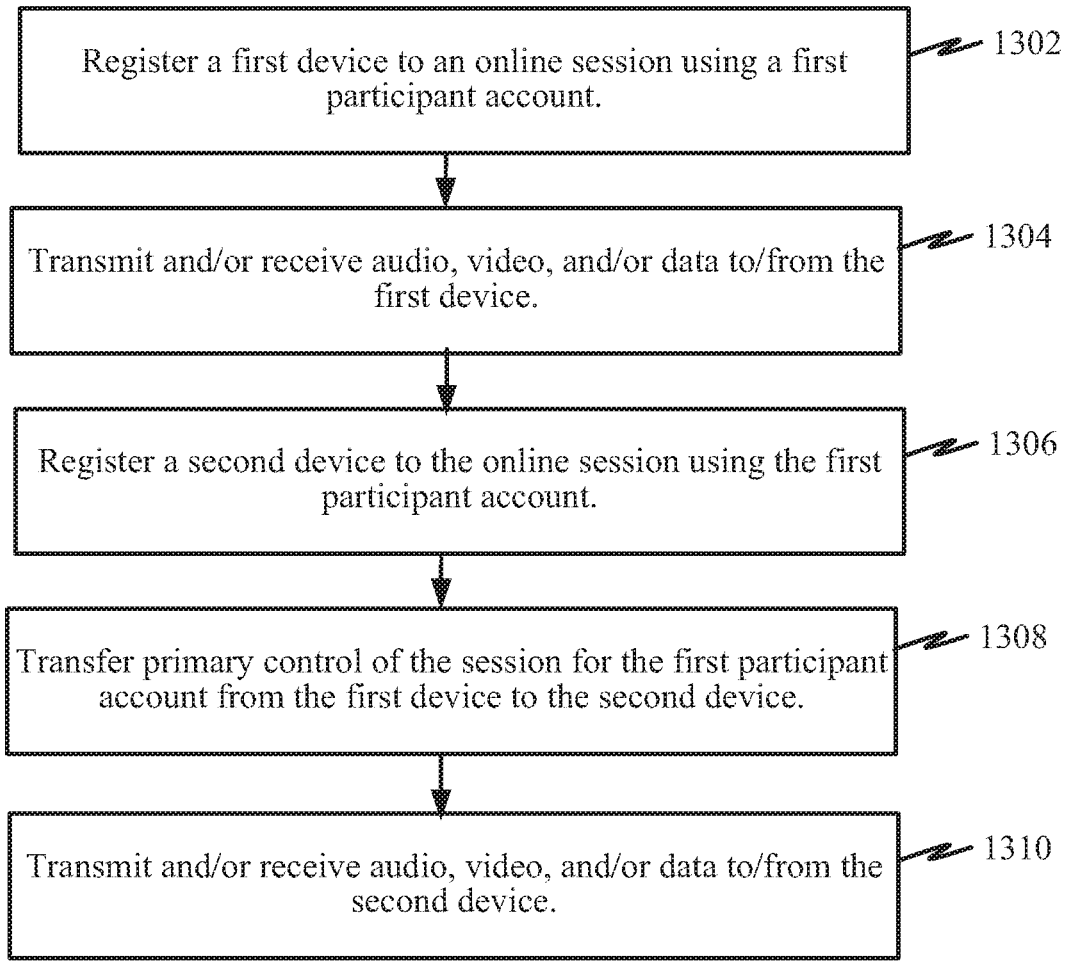
FIG. 13 illustrates a method operational at a session host to transfer an ongoing online session from a first device to a second device thereby permitting a user to continue participation in the online session while moving between devices.

FIG. 13 illustrates a method operational at a session host to transfer an ongoing online session from a first device to a second device thereby permitting a user to continue participation in the online session while moving between devices. A first device may register to or join an online session using a first participant account 1302. The session host may then transmit and/or receive audio, video, and/or data to/from the first device 1304.

Subsequently, a user of the first device may wish to transfer the online session to a second device and may register the second device with the online session using the first participant account 1306. If the user wishes to manage his/her participation in the online session from the second device, the user may request to transfer primary control of the session for the first participant account from the first device to the second device 1308. The session host may then transmit and/or receive audio, video, and/or data to/from the second device 1310.

In another example, the registration of the second device 1306 may be bypassed or skipped. Instead, a website interface may be used to transfer a call/session from the first device to the second device, e.g., by ringing the call or popping up a browser link on the second device, then closing the website interface and session on the first device.

In yet another example, a user may be using two or more devices concurrently to participate in a session (e.g., a primary device and one or more accessory devices. When transferring such session, all features and/or communication links from multiple devices may be consolidated by the second device.

According to another aspect, where the first device is using an accessory device during a session, the communication links/features for the accessory device may be transferred to the second device while the first device remains active in the session. Such transfer may be effectuated, for example, within a website interface from the first device.

Online Classroom Use Case with Live Polling

In one example of an online session, a class or tutoring session may be hosted between a session leader (e.g., teacher, tutor, etc.) and one or more students. In this case, each student may be able to share audio and video (e.g., a digital whiteboard, writing surface or screen) to allow a session leader (or other assistant participants) to review work done by the students.

According to one aspect, the students may join the session using participant devices (e.g., with video and/or audio capabilities). The participant devices may transmit their captured audio and/or video to the session host (e.g., a website or host server). The session leader may restrict which video and/or audio from the students is shared with other session participants. For instance, the session leader may configure the session so that all shared video (e.g., worksheets, digital write pad, etc.) and/or audio from the student participant devices is only visible to the session leader (e.g., it is not shared with other student participants). In other instances, a single student's shared video (e.g., worksheets, digital write pad, etc.) may be shared with all session participants to allow the selected student to share his/her work. In this manner, a session leader may configure which content (video and/or audio) is shared among session participants.

Another aspect provides for instant collection of live polling information during a session. For instance, participants (e.g., students, etc.) may have a window provided by the session host in which they may indicate whether content being discussed in the session is clear or unclear (or various levels of clarity). The feedback collected from participants may be provided (e.g., in real-time) to the host/presenter as feedback, thereby allowing the presenter to clarify content during the session. Additionally, such polling feedback may be recorded and synchronized with the presentation material for the session, thereby permitting a presenter/host to improve a presentation after the session.

Segregated Content Recording and Streaming

According to one aspect, any audio/video content, whiteboard content, and/or presentation/notes content within a session may be stored separately (e.g., in separate files) and timestamped (for synchronization purposes). This permits session streams shared with participants to include separate sub-streams with the distinct content (e.g., audio, video, text, presentation window, whiteboard, etc.) for each window or type of content in a session. By storing and/or recording the distinct types of content and/or windows within the session this permits limiting the content shared during a live session as well as a subsequent playback of a session. That is, during a session playback, a host is capable of electively sharing some of the session content with a participant, based on the participant's level of access to session content.

Multi-User Document Sharing and Tracking within Session

Yet another aspect provides a feature that allows users in a multi-user online session to track what part of a shared document is being viewed by another user within the session. In a multi-user conference session (e.g., two or more participants), there may be one or more shared documents open and/or available for viewing by some or all participants. One feature allows each participant to scroll (e.g., view, read) through a shared document independent of what other participants do with the document. This may be accomplished, in one example, by having the session host (e.g., host server) maintain and display separate instances of the shared document for each participant during the session, thereby allowing each participant to independently scroll and review/read the shared document. There may be instances where it may be desirable for one participant to observe or follow what another participant is viewing or reading within the shared document. For example, in a conference session between a teacher/tutor (e.g., host) and one or more students (e.g., participants), participants may be able to independently read and/or review a shared document, but may also be able to select the teacher's/tutor's name/picture/avatar (e.g., see 226, 228, 230, etc. in FIG. 2B) in the session window to have the shared document display the page, paragraph, and/or section currently being viewed by the teacher/tutor. In this manner, students are able to follow a teacher's/tutor's discussion or vice versa.

Figure 14:
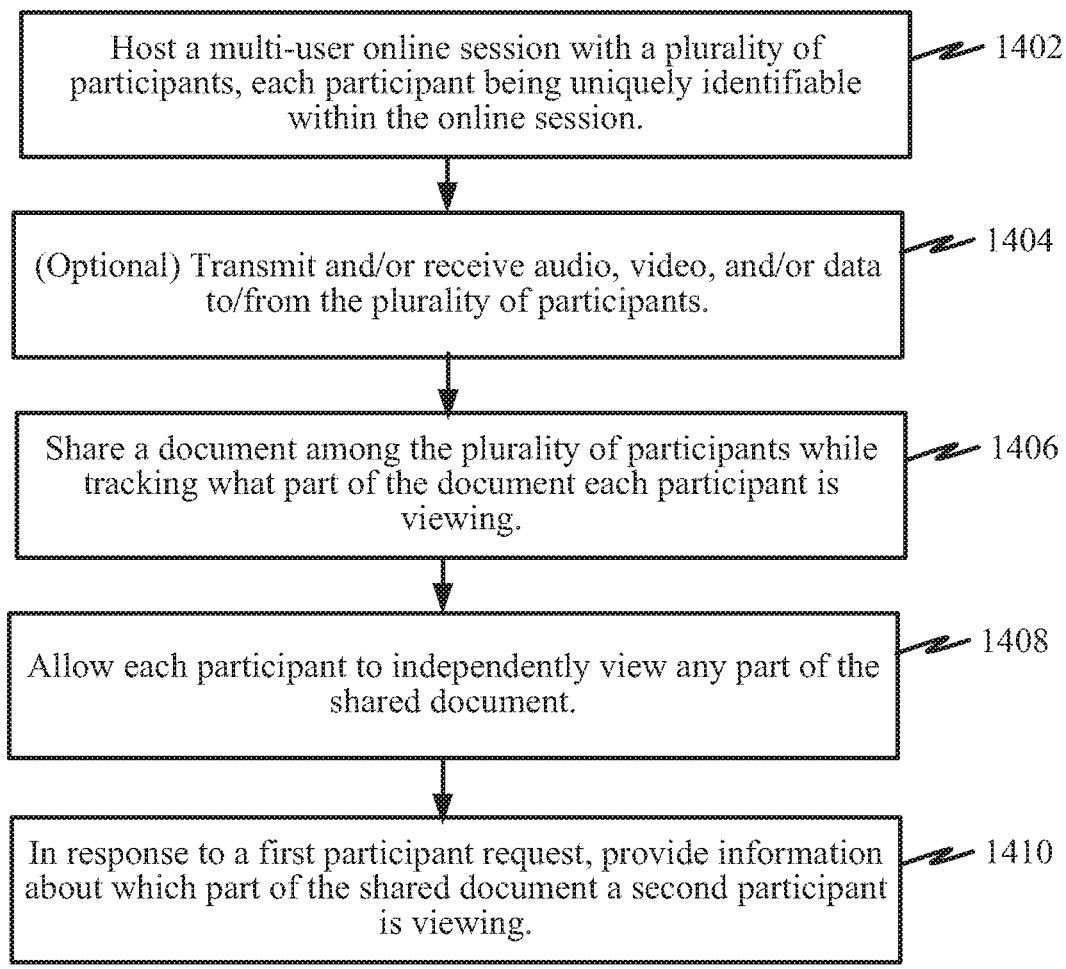
FIG. 14 illustrates an exemplary method for document sharing during a live multi-user online session.

FIG. 14 illustrates an exemplary method for document sharing during a live multi-user online session. For instance, this method may be implemented by one or more of the devices illustrated in FIGS. 1, 2A, 2B, 4, and/or 6. A hosting server/device may host a multi-user online session with a plurality of participants, each participant being uniquely identifiable within the online session 1402. The hosting server/device may transmit and/or receive audio, video, and/or data to/from the plurality of participants 1404.

A document may be shared among the plurality of participants while the hosting server/device tracks what part of the document (e.g., paragraph, line, page, etc.) each participant is viewing 1406. In various examples, the document may be a text, graphic, presentation document, but may also be a video and/or audio document/file. Each participant may be allowed to independently view any part of the shared document 1408. That is, while the online session is ongoing, each participant may independently scroll, read, and/or review the shared document without affecting what other participants do with the shared document.

Additionally, a participant may also be able to follow or track what part of the shared document another participant is currently viewing. For instance, in response to a first participant request, the host server/device may provide information about which part of the shared document a second participant is viewing 1410. In this manner, several participants in an online session may review/read a shared document, each at his/her own pace, while also being able to view what part of the shared document another participant (e.g., a host, teacher, tutor, etc.) may be discussing during the online session.

Web-Based Application and Plug-in/Device-Specific Application

Another feature provides for conference sessions to be delivered to participants both via a web-based application (e.g., through a browser) and through a plug-in application being executed by the operating system of the participant device. In the case of the web-based application, a conference session window is provided through a web-based application, such as a browser while being hosted by a hosting server. The plug-in application may be any application that is downloaded into a participant's device and executed by the participant's device operating system to provide an interface through which to view and interact with a conference session. The plug-in application may also communicate with the host server, but directly rather than through a browser, to obtain session content. According to one feature, the user interface and layout of the web-based application and the plug-in application may be the same so as to provide a consistent experience to participants/users.

According to one aspect, a participant may join the same conference session via the web-based application and the plug-in application concurrently, e.g., using the same user credentials, on the same participant device or via different participant devices. Additionally, the plug-in application may permit a session participants to share one or more documents privately and independent of the conference session.

According to one feature, the plug-in application may also permit a first participant to allow a second participant to remotely access first participant's device. For instance, the plug-in application may be delivered to a user that requires technical support, the user may then execute the plug-in application on his/her device to setup a session with a host (e.g., technical support), and the host may then request remote access to the device from the user. Upon being granted access by the user, the host may then remotely access the device to provide support as needed.

Another feature provides for seamlessly transferring an ongoing conference session between a web-based application and a plug-in application on the same device or between different devices. For instance, this may be done by a participant to transfer the conference session to a platform/device that has more resources (e.g., additional cameras, mobility, bandwidth, etc.).

Yet another aspect provides a plurality of different ways of joining a session. Various examples provide for a participant to join a conference session by logging in via a web-based application or plug-in application using a user account, or by having the plug-in application automatically start and join the conference session on a predetermined date and time, and/or by receiving a link or reminder to join the conference session immediately prior to the conference session (e.g., via a phone call or text).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. While some examples may or may not be specifically directed to use cases or applications, a wide assortment of applicability of described innovations may occur.

A system, method, and computer-readable storage devices are disclosed which address the issues raised above regarding sharing electronic media generated by more than one device in an online meeting. The various embodiments disclosed herein can allow a user to connect to an online meeting server with a designated primary device while sharing a digital feed generated by more than one device at a time. The user may designate any one of the devices as the primary device, by which the user can aggregate digital feed generated by any of the user's primary and peripheral devices. The user may dynamically add and remove digital feeds from peripheral devices via the primary device without having to join the meeting with every device. The primary device may allow the user to control which portions of the digital feed are shared in the online meeting, and to what extent (i.e., volume, video size, etc.). In addition, the user may move from one device to another device at any time to designate the new active device as the primary device.

In some embodiments, a server can receive from a primary device an aggregated digital feed containing one or more digital feeds from the primary device and a peripheral device. The aggregated digital feed may include information associated with each of the aggregated digital feeds. The information may be configured to notify the server of an arrangement of the data, or how the data is to be shared with other users in the online meeting.

What is claimed is:

1. A method operational by a session host device, comprising:
   hosting an online session including a plurality of participant devices over a network, each participant device identified by a participant account and/or a unique device identifier;

receiving a request from a first device to be added to the online session, the first device associated with a first participant account and a first unique device identifier;

receiving a request from a second device to be added to the online session, the second device associated with the first participant account and a second unique device identifier; and transmitting and receiving individual streams of session content to or from each participant device, including the first device and the second device, wherein the individual streams of session content includes a first stream to the first device, a second stream from the first device, and at least one of a third stream to the second device or a fourth stream from the second device, and the session content includes data, audio, and/or video which are transmitted as distinct sub-streams within a stream of session content.

2. The method of claim 1, wherein the session host device dynamically adjusts bandwidth allocation of at least one of the first, second, third, or fourth streams.

3. The method of claim 1, wherein the second stream includes session content captured at the first device, the fourth stream includes session content captured at the second device.

4. The method of claim 1, wherein the session host device selectively sends a first subset of session content to a first subset of participant devices and a second subset of session content to a second subset of participant devices, wherein the first subset of session content is different from the second subset of session content.

5. The method of claim 1, wherein participants request to be added to the online session via a website interface.

6. The method of claim 1, further comprising:
selectively sharing content received from some participants with other participants in the online session.

7. The method of claim 1, further comprising:
recording different types of session content separately but synchronized in time, wherein the different types of session content include at least two of audio, video, text, and graphic content.

8. The method of claim 1, wherein the online session includes a web-based participant interface and session content is shared with participants via the web-based participant interface.

9. The method of claim 1, further comprising:
requesting payment from session participant devices via a web-based participant interface; and
restricting transmission of a subset of session content to only participant devices from which payment is received.

10. The method of claim 1, further comprising:
receiving a request from the first device to transfer its session participation to a third device; and
transmitting a stream of session content, previously sent to the first device, to the third device.

11. The method of claim 1, further comprising:
providing a real-time polling interface to at least a subset of participant devices;
receiving real-time polling information from the subset of participant devices; and
adjusting the session content based on the real-time polling information received.

12. A method operational by a session host device, comprising:

hosting an online session including a plurality of participant devices over a network, each participant device identified by a participant account and/or a unique device identifier;

obtaining location information for the plurality of participant devices;

receiving a request from a first device to be added to the online session, the first device associated with a first participant account and a first unique device identifier;

receiving a request from a second device to be added to the online session, the second device associated with the first participant account and a second unique device identifier; and transmitting and receiving individual streams of session content to or from each participant device, including the first device and the second device;

receiving audio signals over a plurality of different streams of session content from the plurality of participant devices; and transmitting the received audio signals to other session participant devices except to those participant devices that have been identified as being in close proximity to a participant device from which a particular audio signal originated.

13. The method of claim 12, wherein the proximity to the participant device is also inferred from the use of the same participant account by two devices.

14. A method operational by a session host device, comprising:

hosting an online session including a plurality of participant devices over a network, each participant device identified by a participant account and/or a unique device identifier;

obtaining location information for the plurality of participant devices;

receiving a request from a first device to be added to the online session, the first device associated with a first participant account and a first unique device identifier;

receiving a request from a second device to be added to the online session, the second device associated with the first participant account and a second unique device identifier; and transmitting and receiving individual streams of session content to or from each participant device, including the first device and the second device;

receiving a plurality of questions from one or more of the plurality of participant devices;

receiving offers of payment associated with at least some of the received questions;

prioritizing questions to answer based on the offers of payment, where questions having higher payment offers are given highest priority.

15. A method operational at a first device, comprising:
joining an online session using a first participant account and a first unique device identifier, the online session including a plurality of participant devices and hosted by a host server over a network, each participant device identified by a participant account and/or a unique device identifier, each participant account associated with a single user;

sending a request for a second device to be added to the online session, the second device using the first participant account and a second unique device identifier to join the online session;

receiving a stream of session content from the host server; and relaying a sub-stream of session content within the stream of session content to the second device.

16. The method of claim 15, further comprising:
sending a stream of session content from the first device to the host server, the first stream including separate sub-streams of at least two of audio, video, text, and graphic content captured at the first device.

17. The method of claim 15, further comprising:
relaying a stream of session content from the second device to the host server.

18. The method of claim 15, wherein the first device joins the online session via a website interface.

19. The method of claim 15, wherein the online session includes a web-based participant interface and session content is shared with participants via the web-based participant interface.

\* \* \* \* \*